Patented Jan. 8, 1935

1,987,397

UNITED STATES PATENT OFFICE 1,987,397

PREPARATION OF CUTTING OILS

Benjamin Gollsworthy, Glenham, N. Y., assignor to The Texas Company, New York, N. Y., a corporation of Delaware No Drawing. Application June 15, 1933
Serial No. 675,879

9 Claims. (Cl. 87—9)

This invention relates to the preparation of cutting oils, and more particularly to the preparation of cutting oils containing sulfurized hydrocarbons.

As is well known, the purposes of a cutting oil are to cool the cutting tool, to reduce the energy consumption and to insure a good finish on the work. Pure mineral oils have a limited usefulness as cutting oils on account of their poor adhesive qualities. The more usual and better practice is to compound the mineral oil either with fatty oils or with sulfurized hydrocarbons, or with both.

Cutting oils, containing sulfurized hydrocarbons, have a particular merit in that these oils appear to be extremely satisfactory for use where high speed cutting operations are carried out. The office of the sulfur, when chemically united with hydrocarbons, is to increase the heat-absorbing properties of the compound.

I have discovered a highly satisfactory method for preparing sulfurized hydrocarbons which are particularly useful in preparing cutting oils. This is accomplished by mixing together a petroleum hydrocarbon lubricating oil with oxidized paraffin wax, and then reacting this mixture at elevated temperatures with sulfur. The product from this reaction, when used alone or when blended with a diluent hydrocarbon oil, gives particularly satisfactory results as a coolant in the cutting or shaping of metals.

In order to give a clearer understanding of my invention, I cite herewith a precedure that was followed in preparing a cutting oil base or concentrate which was found to contain 5.17% of combined sulfur. Although specific quantities and temperatures are given in the example, other proportions of reactants, as well as other conditions of reaction, may be found to be equally advantageous. Approximately 17,600 grams of petroleum hydrocarbon oil having the following tests:

| | |
|---|---|
| Viscosity in seconds Saybolt universal at 100° F | 207 |
| Flash ° F. Cleveland open cup | 355 |
| Fire ° F | 395 | were mixed with about 2070 grams of oxidized paraffin wax having a melting point in the neighborhood of 95° F. This mixture was then charged into a kettle provided with a mechanically driven stirrer and the temperature of the charge raised to approximately 330° F. When this temperature was reached, approximately 1550 grams of powdered sulfur were gradually added and the temperature of the reaction mixture raised to between 380° and 400° F. The mixture was then stirred for approximately three hours, during which time considerable evolution of hydrogen sulfide took place. Considerable heat was given off in the course of the reaction as was evidenced by the fact that the temperature of the reaction mixture rose to a value of about 430° F.

When the reaction was complete, the mixture was settled for a considerable length of time in order to permit of the separation of such sludge as was formed as a result of the reaction. The settled product gave the following tests:

| | |
|---|---|
| Gravity A. P. I | 16.0 |
| Viscosity in seconds Saybolt universal at 100° F | 383 |
| Flash ° F | 360 |
| Fire ° F | 405 |
| Sulfur % | 5.17 |

The product when used as a coolant was found to give very satisfactory results. Similarly, when the product was blended with an equal volume of a light petroleum hydrocarbon oil having a viscosity of approximately 70 seconds Saybolt universal at 100° F., it was ideally suited for metal cutting operations in which a more fluid coolant was necessary.

In preparing sulfurized hydrocarbons, in accordance with my invention, it is possible to bring about a combination of greater quantities of sulfur than can be obtained by merely reacting a mineral hydrocarbon oil with sulfur. It appears that this effect results from the presence of the oxidized paraffin wax. In carrying out the sulfurization reaction, almost any one of the various petroleum hydrocarbon oil fractions may be used as a reactant. The choice of the proper fraction is controlled by the temperature and pressure conditions which are used for bringing about the desired reactions. Where it is desired to produce sulfurized hydrocarbons containing higher percentages of combined sulfur, the use of superatmospheric pressures which may be as high as 200 pounds per square inch or higher may be found necessary.

In compounding the sulfurized hydrocarbons with diluting hydrocarbon oils, the choice of the particular diluent is dictated by the type of operation for which the product is being used. In those cases where an extremely fluid product is required, the sulfurized hydrocarbons may be compounded with, or dissolved in a light petroleum hydrocarbon oil of the type of kerosine or mineral seal oil. In other operations, more viscous diluents, such as lubricating oils, may be used with advantage.

Obviously many modifications and variation of the invention, as hereinbefore set forth, may be made without departing from the spirit and scope thereof, and therefore only such limitations should be imposed as are indicated in the appended claims.

I claim:

1. A method of preparing a sulfurized hydrocarbon compound which comprises reacting a mixture of a petroleum hydrocarbon oil and oxidized paraffin wax with sulfur at a temperature above about 330° F.

2. A method of preparing a sulfurized cutting oil concentrate which comprises mixing petroleum hydrocarbon oil with oxidized paraffin wax, heating the mixture to a temperature of about 330° F., and then reacting it with sulfur at a temperature above 330° F.

3. A method of preparing a cutting oil which comprises reacting a mixture consisting of a petroleum hydrocarbon oil and from 5 to 20% of oxidized paraffin wax with from 5 to 10% of sulfur at a temperature above about 330° F.

4. A method of preparing a cutting oil which comprises reacting a mixture of a petroleum hydrocarbon oil and oxidized paraffin wax with sulfur at a temperature above about 330° F., settling the reaction product to remove sludge, and compounding the sludge-free reaction product with a low viscosity petroleum hydrocarbon lubricating oil.

5. A method of preparing a sulfurized hydrocarbon compound which comprises reacting a mixture of a petroleum hydrocarbon oil and oxidized paraffin wax with a sulfur at a temperature above about 330° F. and under superatmospheric pressure.

6. A cutting oil concentrate comprising petroleum hydrocarbon oil, oxidized paraffin wax and sulfur combined by reaction at a temperature of above about 330° F.

7. A cutting oil concentrate comprising sulfurized hydrocarbons obtained by heating a mixture of petroleum hydrocarbon oil and oxidized paraffin wax with sulfur.

8. A cutting oil comprising a petroleum hydrocarbon lubricating oil and the product obtained by heating a mixture of petroleum hydrocarbon oil, and oxidized paraffin wax with sulfur.

9. A cutting oil comprising a petroleum hydrocarbon lubricating oil having a viscosity of about 70 seconds Saybolt universal at 100° F. and about an equal volume of sulfurized hydrocarbons obtained by heating a petroleum hydrocarbon oil and oxidized paraffin wax with sulfur.

BENJAMIN GALLSWORTHY.